United States Patent
Omata

[11] Patent Number: 5,881,302
[45] Date of Patent: Mar. 9, 1999

[54] VECTOR PROCESSING UNIT WITH RECONFIGURABLE DATA BUFFER

[75] Inventor: Makoto Omata, Yamanashi, Japan

[73] Assignee: NEC Corporation, Tokyo, Japan

[21] Appl. No.: 857,327

[22] Filed: May 16, 1997

Related U.S. Application Data

[63] Continuation of Ser. No. 453,266, May 30, 1996, abandoned.

[30] Foreign Application Priority Data

May 31, 1994 [JP] Japan .................................. 6-117784

[51] Int. Cl.$^6$ .......................... G06F 15/347; G06F 12/04
[52] U.S. Cl. .................... 395/800.02; 395/800.6; 711/202; 711/212; 711/220
[58] Field of Search .................. 395/800.06, 800.02, 395/800.03, 800.04, 800.05, 800.1; 711/118, 149, 202, 215, 220

[56] References Cited

U.S. PATENT DOCUMENTS

| | | | |
|---|---|---|---|
| 4,771,380 | 9/1988 | Kris ...................................... | 395/800.06 |
| 4,825,361 | 4/1989 | Omoda et al. ...................... | 395/800.06 |
| 4,888,679 | 12/1989 | Fossum et al. ..................... | 395/800.06 |
| 4,910,667 | 3/1990 | Tanaka et al. ......................... | 711/168 |
| 5,237,702 | 8/1993 | Hayashi et al. ..................... | 395/800.07 |
| 5,513,366 | 4/1996 | Agarwal et al. .................... | 395/800.22 |
| 5,598,574 | 1/1997 | Yoshinaga et al. ................. | 395/800.02 |

*Primary Examiner*—Eddie P. Chan
*Assistant Examiner*—Hong Kim
*Attorney, Agent, or Firm*—Whitham, Curtis & Whitham

[57] ABSTRACT

A vector processing unit includes data buffers between a storage and a vector processor. Each of the data buffers is divided into four virtual buffers. Each virtual buffer can store 16 words of data, each word having 8 bytes. Accordingly, one load data buffer can store four 8-byte vector data when the vector length is 16, and one 8-byte vector data when the vector length is 64. By compressing two 4-byte vector data into one 8-byte vector data, it is possible to store four 4-byte vector data when the vector length is 32, and 4-byte vector data when the vector length is 128.

10 Claims, 13 Drawing Sheets

| LOAD DATA BUFFER | BUFFER NUMBER | BUFFER ADDRESS | STORABLE ELEMENTS | |
|---|---|---|---|---|
| | | | 8 BYTE | 4 BYTE |
| 110 | #0 | 0~63 | 64 | 64(128) |
| | #1 | 16~63 | 48 | 64(96) |
| | #2 | 32~63 | 32 | 64 |
| | #3 | 48~63 | 16 | 32 |
| 120 | #4 | 0~63 | 64 | 64(128) |
| | #5 | 16~63 | 48 | 64(96) |
| | #6 | 32~63 | 32 | 64 |
| | #7 | 48~63 | 16 | 32 |

FIG.3

(1) VLDL V0 ← MEM
(2) VLDL V1 ← MEM
(3) VADD V0 ← V0+V1
(4) VSTL MEM ← V0
(5) VLDU V0 ← MEM
(6) VLDU V1 ← MEM
(7) VFAD V0 ← V0+V1
(8) VSTU MEM ← V0

VECTOR PROCESSING UNIT WITH RECONFIGURABLE DATA BUFFER

CROSS REFERENCE TO RELATED APPLICATION

This is a Continuation of application Ser. No. 08/453,266, filed May 30, 1996, now abandoned.

BACKGROUND OF THE INVENTION

1. Field of the Invention

The present invention relates to a vector processing unit, and, more particularly, to a vector processing unit having a data buffer between a storage and a vector processor.

2. Description of the Prior Art

In a storage shared vector processing unit, a physical distance to the storage tends to be longer as the system becomes larger in its size in view of mounting. Therefore, storage access takes much time.

The vector processing unit attains high speed arithmetic processing by continuous arithmetic processing of a large amount of data simultaneously. That is, after a group of operands is loaded from the storage to a vector register, arithmetic processing is performed by supplying the arithmetic operand to a processor from the vector register. Then, the result is stored again in the vector register the content of which is in turn stored in the storage.

Referring to FIG. 10, there is shown an example of operation in a conventional vector processing unit where vector processing is performed by transferring data between the storage and the vector register without providing any buffer. In the example, the vector processing is performed by using data from the storage with two vector load instructions VLD, and then the result of processing is written in the storage with a vector store instruction VST. Therefore, there arises idle time because of storage access. As the idle time for storage access becomes longer, idle time in the processing unit also becomes longer so that the usage efficiency of the processor is being deteriorated.

In addition, since a plurality of vector processors is provided in a the vector processing unit, there is possibility of contention in storage access in each vector processor. Therefore, it is not necessarily guaranteed that data is returned at the minimum access time so that the idle time tends to occur more often.

In order to solve this problem, the conventional vector processing unit provides a buffer between the vector register and the storage for separating the storage access from the vector processing. This improves the vector processing unit by allowing it to load data in advance so that subsequent vector processing can be continuously performed after storing the data whether or not the storage access is performed.

Referring to FIG. 11, the conventional vector processing unit 1800 comprises a vector processor 1700 having a crossbar 1710, vector registers 1720, 1721, and a processor 1730; load data buffers 1100 with a load data buffer storing circuit 1200, and a load data buffer read circuit 1300 for storing vector data to be sent to the vector processor 1700; and store data buffers 1400 with a store data buffer store circuit 1500, and a store data buffer read circuit 1600 for storing the result of processing by the vector processor 1700.

Then, the number of words per each of the load data buffers 1110 and 1120 is designed for the maximum number of elements by a vector instruction. In addition, although the number of load data buffers is two of buffers 1110 and 1120 here, it is designed by estimating the number of load instructions for which data is not returned although the instruction is issued.

Furthermore, the number of words per each of the store data buffers 1410 and 1420 is also designed for the maximum number of elements by a vector instruction. Then, the number is designed by estimating the number of store instructions which may be executed from issuance of a store instruction to storing in a storage 1900.

Referring to FIGS. 12 (A) and 12 (B), if vector length in FIG. 12 (A) is eight, the number of vector load instructions VLD is four, which can be started for issuance until the vector processing can be executed. In addition, if the vector length in FIG. 12 (B) is four, the number of vector load instructions VLD is seven, which can be started for issuance until the vector processing can be executed. Therefore, although, if the vector length is eight, four load data buffers may be sufficient, seven load data buffers are required if the load vector length is four.

Next, description is made on the operation of instructions and the result of processing by using an example of an instruction sequence. Here, for the purpose of description, it is assumed that the number of load data buffers and store data buffers is two, respectively, each has a capacity of 8 bytes×64 words, there are an 8-byte load instruction VLD, an upper 4-byte load instruction VLDU, a lower 4-byte load instruction VLDL, an 8-byte store instruction VST, an upper 4-byte store instruction VSTU, a lower 4-byte store instruction VSTL, a fixed point addition VADD, and a floating point addition VFAD, and the maximum number of vector elements which these instruction can have is 64. Furthermore, the vector registers are refered to as V0 and V1.

Here, it is assumed that the instruction sequence shown in FIG. 9 is executed by assuming that the vector length is 16.

Referring to FIG. 13, when the instruction sequence is processed in the conventional vector processing unit by using two load data buffers, vector load instructions of instructions (1) and (2) are first assigned with the load data buffers 1110 and 1120, respectively. Then, the load data buffers 1110 and 1120 are also used for vector load instructions of instructions (5) and (6). Similarly, vector store instructions of instructions (4) and (8) are assigned with the store data buffers 1410 and 1420, respectively.

In this case, because there are only two load data buffers, the instruction (5) cannot be issued until the load data buffer V0, which is used by the instruction (1), is released. Thus, delay time as shown in FIG. 13 occurs.

Referring to FIG. 14, since the load data buffers 1110, 1120 and the store data buffers 1410, 1420 are configured in a fixed size, there is a possibility that a number of unused regions is caused in the load data buffers 1110, 1120, and the store data buffers 1410, 1420 if the vector is short.

As an example of such a conventional vector processing unit, European Patent Application No. 445,802-A2 describes a vector processing unit with a store buffer.

As described above, because the conventional vector processing unit has the fixed number and capacity of data buffers, it has a disadvantage that the usage efficiency is degraded depending on a program configuration. That is, when the vector length is long, there is little impact on the performance even if the number of data buffers is relatively small. However, if the vector length is short, the vector processor may not be efficiently utilized without providing a large number of data buffers. On the other hand, because vector length depends on a program, a relatively large number of data buffers should be provided for a case where the vector length is short to fully extract the performance of the conventional vector processing unit regardless of the vector length, which causes a problem that the amount of hardware is increased.

SUMMARY OF THE INVENTION

An object of the present invention is to solve the above problems and to efficiently use the data buffers.

Another object of the present invention remove a waiting of the data buffers even for a short vector length so that the performance of the vector processor is fully extracted.

In a preferred embodiment of the present invention, the vector processing unit is a vector processing unit comprising a vector processor and having a data buffer between the vector processor and a storage, wherein the data buffer is variably arranged for the number of word which can be stored and the number of divisions of the buffer. In addition, the data buffer may be variably arranged for data width per word.

BRIEF DESCRIPTION OF THE DRAWINGS

An aspect of the present invention becomes clearer when it is described in respect to the following drawings, in which:

FIG. 3 is a diagram showing the number of storing elements of the load data buffer in the present invention;

DETAILED DESCRIPTION OF THE PREFERRED EMBODIMENTS

Figure 1:
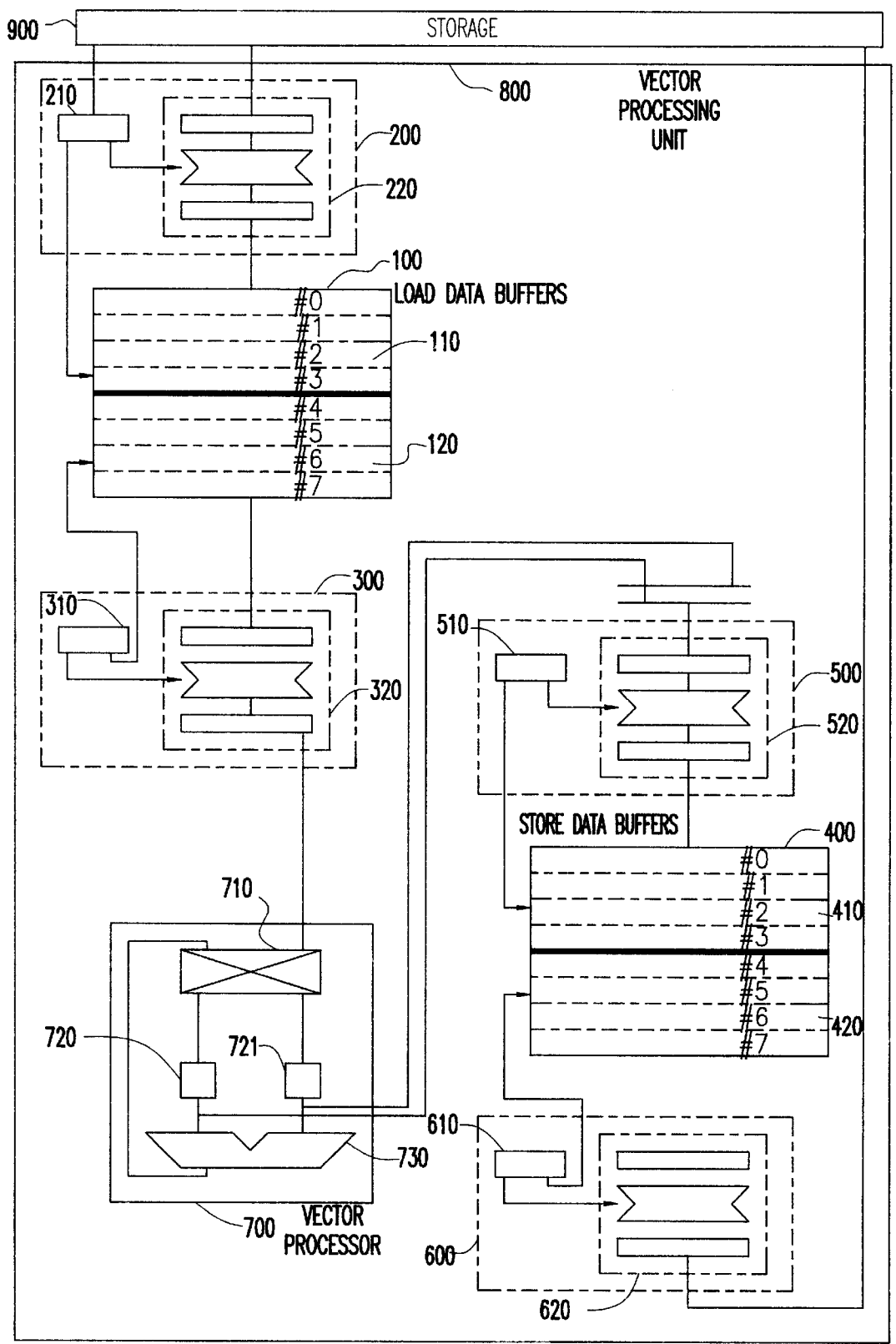
FIG. 1 is a diagram showing a configuration of a vector processing unit according to the present invention.

An embodiment of the present invention will be explained in detail by referring to the drawings.

Referring to FIG. 1, in a preferred embodiment of the present invention, a vector processing unit 800 comprises a vector processor 700 connecting to a storage 900 and performing vector processing, load data buffers 100 storing vector data to be supplied to the vector processor 700, and store data buffers 400 storing results of processing by the vector processor 700. In addition, there are provided a load data buffer storing circuit 200 and a load data read circuit 300 for storing and reading the vector data to and from the load data buffers 100. Similarly, there are provided a store data buffer store circuit 500 and a store data buffer read circuit 600 for storing and reading the vector data to and from the store data buffers 400. Furthermore, the vector processor 700 comprises vector registers 720 and 721 for holding vector data, a processor 730, and a crossbar 710 for transmitting the result of processing to the vector registers.

For simplicity of description, it is assumed that the embodiment has two load data buffers and two store data buffers, and each data buffer has a capacity of 8 bytes×64 words. In addition, the number of buffers assigned to one data buffer is assumed to be four at maximum. Furthermore, the type of instructions is assumed to include 8-byte load instruction VLD, upper 4-byte load instruction VLDU, lower 4-byte load instruction VLDL, 8-byte store instruction VST, upper 4-byte store instruction VSTU, lower 4 byte store instruction VSTL, fixed point addition VADD, and floating point addition VFAD. Each of these instructions is assumed to be able to specify up to 64 as the vector length. Furthermore, the vector registers are two, V0 and V1.

Figure 2:
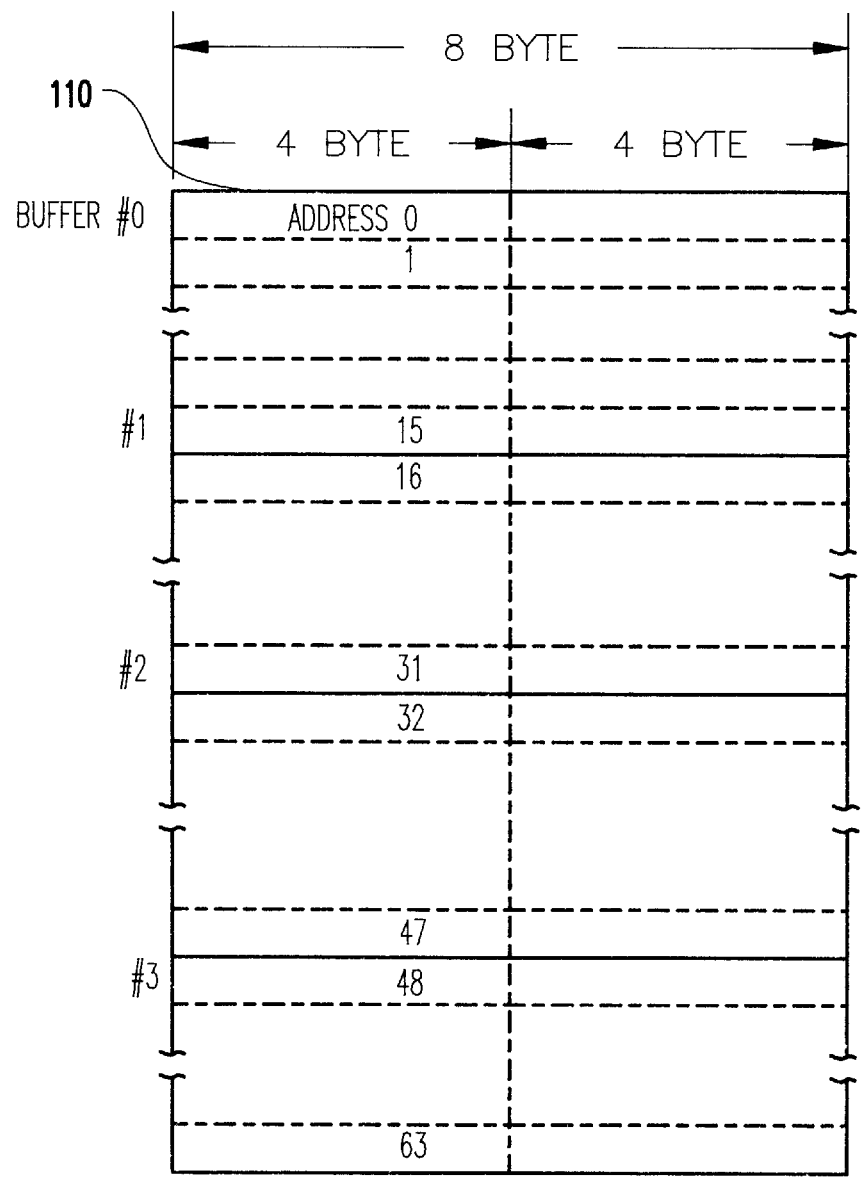
FIG. 2 is a configuration of a load data buffer in the present invention.

Referring to FIG. 2, the load data buffer 110 is arranged to be able to store 64 words of 8-byte data, and divided into four virtual buffers #0 to #3. Accordingly, addresses 0 to 15 of the load data buffer correspond to the virtual buffer #0, addresses 16 to 31 of the load data buffer to the virtual buffer #1, addresses 32 to 47 of the load data buffer to the virtual buffer #2, the addresses 48 to 63 of the load data buffer to the virtual buffer #3.

Referring to FIG. 3, a region available in the load data buffer 110 is addresses 0 to 63 when the virtual buffer #0 is specified, addresses 16 to 63 when the virtual buffer #1 is specified, addresses 32 to 63 when the virtual buffer #2 is specified, and addresses 48 to 63 when the virtual buffer #3 is specified. That is, the number of the virtual buffer means the starting address in the load data buffer. Therefore, if there are vector data A and B each having vector length of 32, for example, it is possible to assign the vector data A to the virtual buffer #0 and the vector data B to the virtual buffer #2.

The load data buffer 120 has the same arrangement as the load data buffer 110, except that the number of virtual buffers is #4 to #7.

The store data buffer 410 also has an arrangement similar to the load data buffer 110. In addition, the store data buffer 420 has the same arrangement as the store data buffer 410, except for that the number for virtual buffers is #4 to #7.

The load data buffers 110 and 120, as well as the store data buffers 410 and 420 are addressed as follows. Because the load data buffers 100 have 128 words as a whole, a word address is represented by seven bits. Accordingly, it is possible to identify either the load data buffer 110 or the load data buffer 120 with its most significant bit. In addition, six bits other than the most significant bit represent a word address in one data buffer. The upper two bits of six bits are used to identify the virtual buffer. That is, for the load data buffer 110, they identify any one of #0 to #3, and, for the load data buffer 120, any one of #4 to #7. Then, the lower four bits of the word address correspond to the element number of each of 16 data in each virtual buffer. This is true for the store data buffers 410 and 420.

In the data buffer arranged as above, when the 8-byte load instruction VLD is executed, while only two buffers #0 and #4 can be used if the vector length VL is 49≦VL≦64, eight buffers from #0 to #7 can be used if it is 1≦VL≦16.

For example, when VLD is executed at VL=16, and the buffer #0 is used, the result is stored in addresses 0 to 15 of the load data buffer 110, and addresses 16 to 63 are not used. Therefore, if the following VLD is again VL=16, and, then the buffer #1 is used, the result is stored in addresses 16 to 31 of the load data buffer 110.

Figure 4:
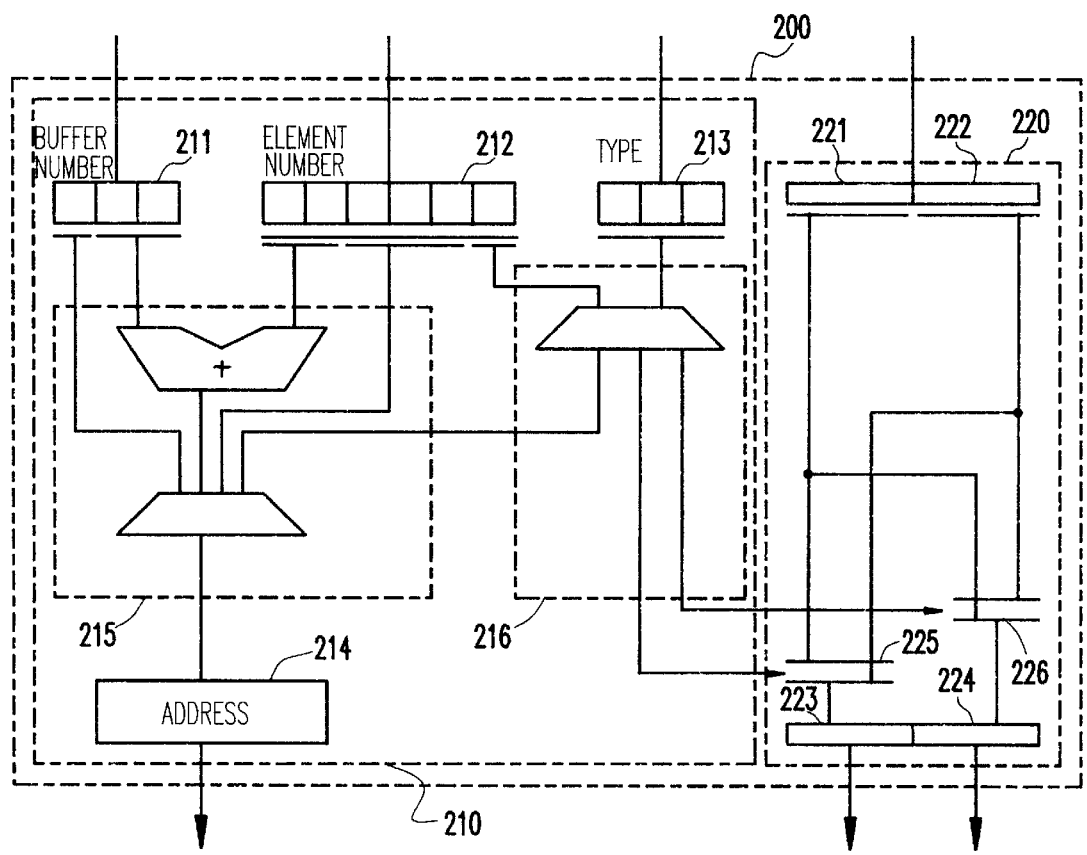
FIG. 4 is a configuration of a load data store circuit in the present invention.

Referring to FIG. 4, the load data buffer storing circuit 200 comprises a load data write control circuit 210 which includes a write buffer number register 211 holding the virtual buffer number of a load data buffer, an element number register 212 holding element numbers in a virtual buffer of the load data buffer, a write instruction type register 213 holding the type of instruction, a write selector control circuit 216 controlling write selectors 225 and 226 in a load data compressing circuit 220, an address generator circuit 215 generating an address of the load data buffer, and a write address register 214 holding the generated address. In addition, the load data buffer storing circuit 200 comprises the load data compressing circuit 220 which includes data receiving registers 221 and 222 receiving data from the storage, write registers 223 and 224 writing data in the load data buffers 100, and an upper write selector 225 and a lower write selector 226 holding data in the data receiving registers 221 and 222 in the write registers 223 and 224.

The load data buffer storing circuit 200 divides 8-byte load data received from the storage 900 into upper four bytes and lower four bytes, and holds them in the data receiving registers 221 and 222 in the load data compressing circuit 220. Then, it determines the type of instruction loading the data by decoding the write instruction type register 213.

If the type of instruction is 8-byte load instruction VLD, the write selector control circuit 216 controls the upper write selector 225 and the lower write selector 226 to hold the received 8 byte data in the write registers 223 and 224 as is. Then, the data in the write registers 223 and 224 are stored in the load data buffers 100 by a write address generated by the write address generator circuit 215 based on the write buffer number 211 and the data element number 212.

If the type of instruction is an upper 4-byte load instruction VLDU, since only the upper four bytes in the receiving register 221 are valid data, the write selectors 225 and 226 are switched to receive data from the receiving register 221. The data from the receiving register 221 is held in the write register 223 if the data element number register 212 indicates an even number, and in the write register 224 if it indicates an odd number. Thus, when data are filled in both the write registers 223 and 224, the data in the write registers 223 and 224 are stored in the load data buffers 100 by the write address generated by the write address generator circuit 215 based on the write buffer number 211 and the data element number 212.

Similarly, if the type of instruction is a lower 4-byte load instruction VLDL, because only the lower four bytes in the receiving register 222 are valid, the write selectors 225 and 226 are switched to receive data from the receiving register 222. Then, the data from the receiving register 222 is held in the write register 223 if the data element number register 212 indicates an even number, and in the write register 224 if it indicates an odd number. Thus, when data are filled in both the write registers 223 and 224, the data in the write registers 223 and 224 are stored in the load data buffers 100 by the write address generated by the write address generator circuit 215 based on the write buffer number 211 and the data element number 212.

Figure 5A:
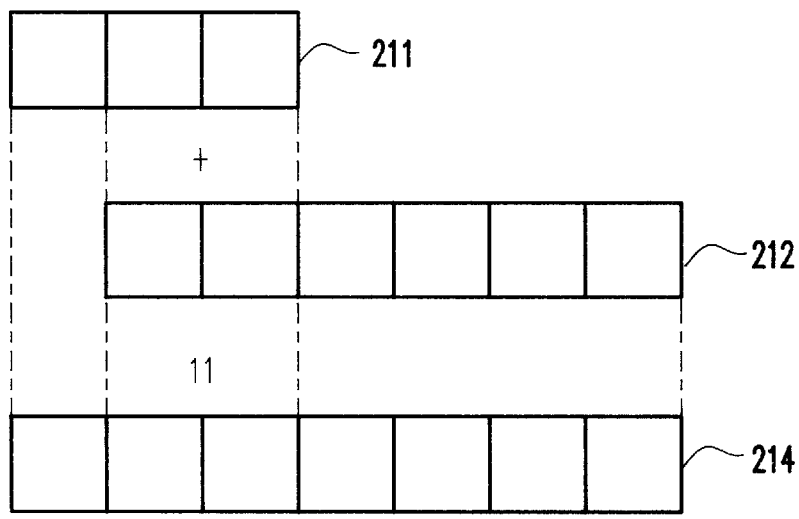
FIGS. 5 (A) and 5 (B) are a diagram showing how to generate a data buffer address in the present invention.
Figure 5B:
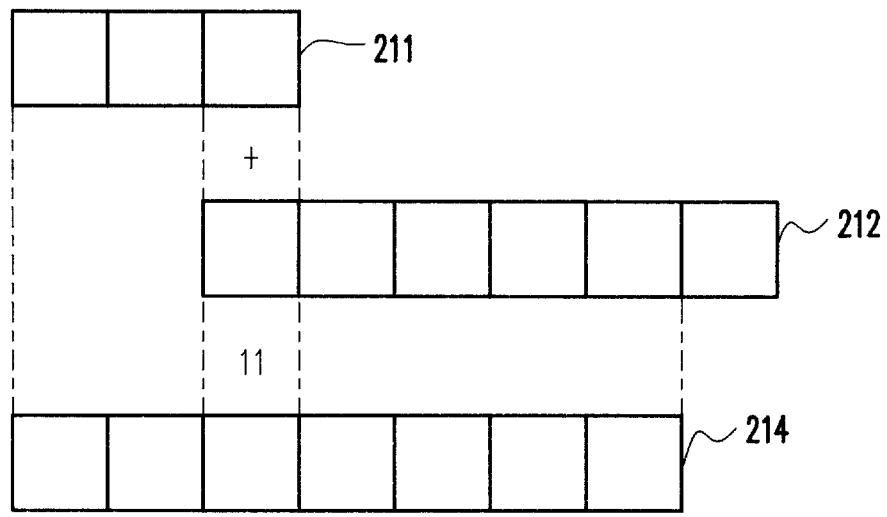

Referring to FIGS. 5 (A) and 5 (B), the write address generator circuit 215 generates a write address for the load data buffers 100 in the following manner. Referring to FIG. 5 (A), if the type of instruction is an 8-byte load instruction VLD, the lower two bits of the write buffer number register 211 and the upper two bits of the element number register 212 are added so that they are overlapped. That is, the address of the load data buffer is obtained by adding the buffer number held in the write buffer number register 211 as a start address to the element number held in the element number register 212.

Referring to FIG. 5 (B), if the type of instruction is a 4-byte load instruction VLDU or VLDL, the lower one bit of the write buffer number register 211 and the upper one bit of the element number register 212 are added so that they are overlapped. That is, the address of the load data buffer is obtained by adding the buffer number held in the write buffer number register 211 as a start address to the element number held in the element number register 212 divided by two.

Figure 6:
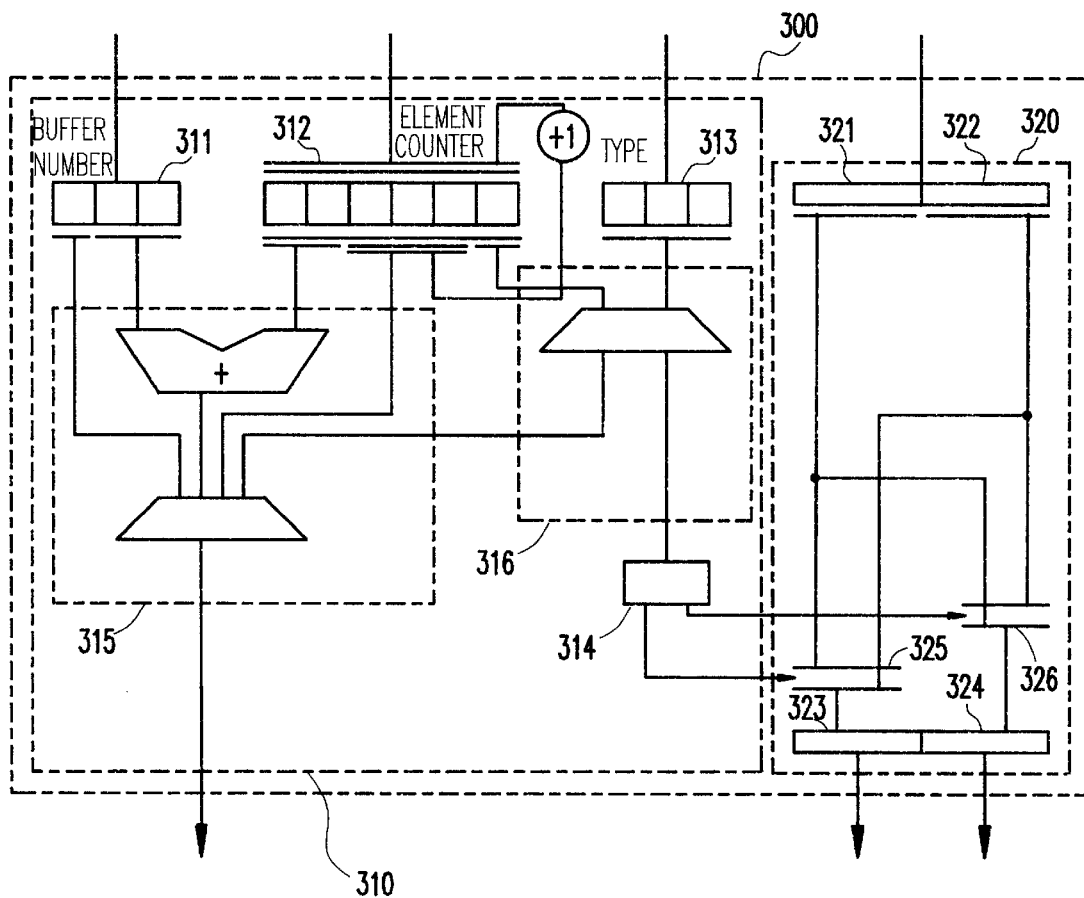
FIG. 6 is a configuration of a load data read circuit in the present invention.

Referring to FIG. 6, the load data buffer read circuit 300 comprises a load data read control circuit 310 which includes a read buffer number register 311 holding the virtual buffer number of the load data buffer, an element number counter 312 counting element numbers in the virtual buffer of the load data buffer, a read instruction type register 313 holding the type of instructions, an alignment selector control circuit 316 generating a signal for controlling alignment selectors 325 and 324 in a load data expand circuit 320, an address generator circuit 315 generating a read address of the load data buffer, and a selector control register 314 holding the control signal from the alignment selector circuit 316. In addition, the load data buffer storing circuit 200 comprises the load data expand circuit 320 which includes read registers 321 and 322 receiving data from the load data buffer, the alignment registers 323 and 324 transferring data to the vector processor 700, and the alignment selectors 325 and 326 holding the data of the read registers 321 and 322 in the alignment registers 323 and 324.

The load data buffer read circuit 300 generates a read address by the read address generator circuit 315 based on the read buffer number 311 and the read element number counter 312. The generated read address is used for reading from the load data buffers 100. The read out data is set in the read registers 321 and 322. Furthermore, the element number counter 312 is incremented every time when one data is sent to the vector processor 700.

The type of instruction relating to the read data is determined by decoding the read instruction type register 313 with a decoder in the alignment selector control circuit 316.

If the type of instruction is an 8 byte load instruction VLD, the write selector control circuit 316 controls the alignment selectors 325 and 326 to set the data of the read registers 321 and 322 in the alignment registers 323 and 324 as is. The data set in the alignment registers 323 and 324 is sent to the vector processor 700. Such operations are repeated by each machine cycle until all elements are read.

If the type of instruction is a 4-byte load instruction VLDU or lower 4-byte load instruction VLDL, there exists the same data in the read registers 321 and 322 over two machine cycles. It is because only one data can be sent to the vector processor 700 in one machine cycle. The alignment selector 325 or 326 alternately switches the read register 321 or 322 by the control signal held in the selector control register 314. This causes the alignment register 323 to set data held in the read register 321 or 322 in the alignment register 323 or 324.

That is, data held in the read register 321 is selected if the element number of read data indicated by the read element number counter 312 is an even number, while data held in the read register 322 is selected if the number is an odd number. Then, if the type of instruction is an upper 4-byte load instruction VLDU, the selected data is set in the alignment register 323. If the type of instruction is a lower 4-byte load instruction VLDL, the selected data is set in the alignment register 324. The data set in the alignment register 323 is sent to the vector processor 700.

The method for generating the read address by the read address generator circuit 315 is similar to that by the write address generator circuit 215 described for FIG. 5. That is, if the type of instruction is an 8-byte load instruction VLD, the read address is generated by the method of FIG. 5 (A), and, if it is a 4-byte load instruction VLDU or VLDL, the read address is generated by the method of FIG. 5 (B).

Although the above description is made on the load data buffer storing circuit 200 and the load data read circuit 300 for the load data buffers 100, the store data buffer store circuit 500 and the store data read circuit 600 for the store data buffers 400 have a similar configuration, respectively.

Next, an example of processing in the embodiment of the vector processing unit of the present invention will be described.

Figure 7:
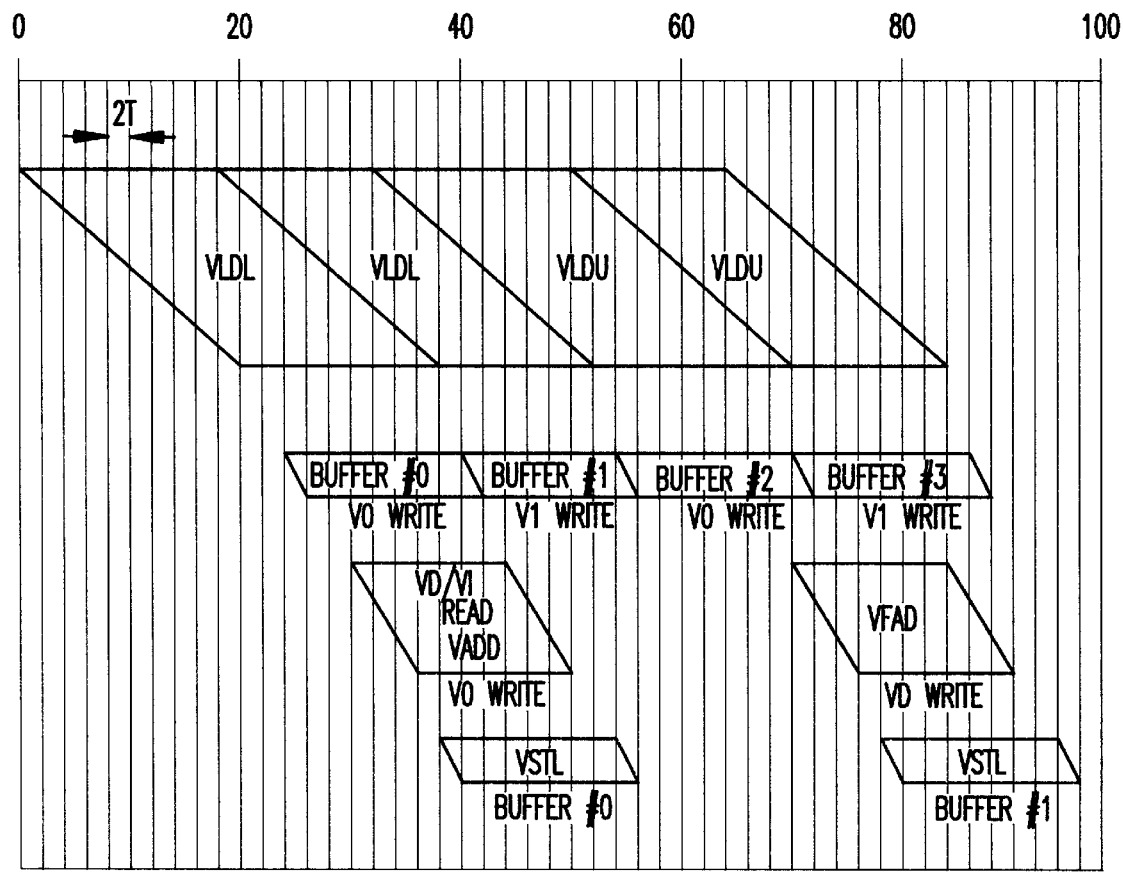
FIG. 7 is a diagram showing operation of vector processing in the present invention.
Figures 9, 10:
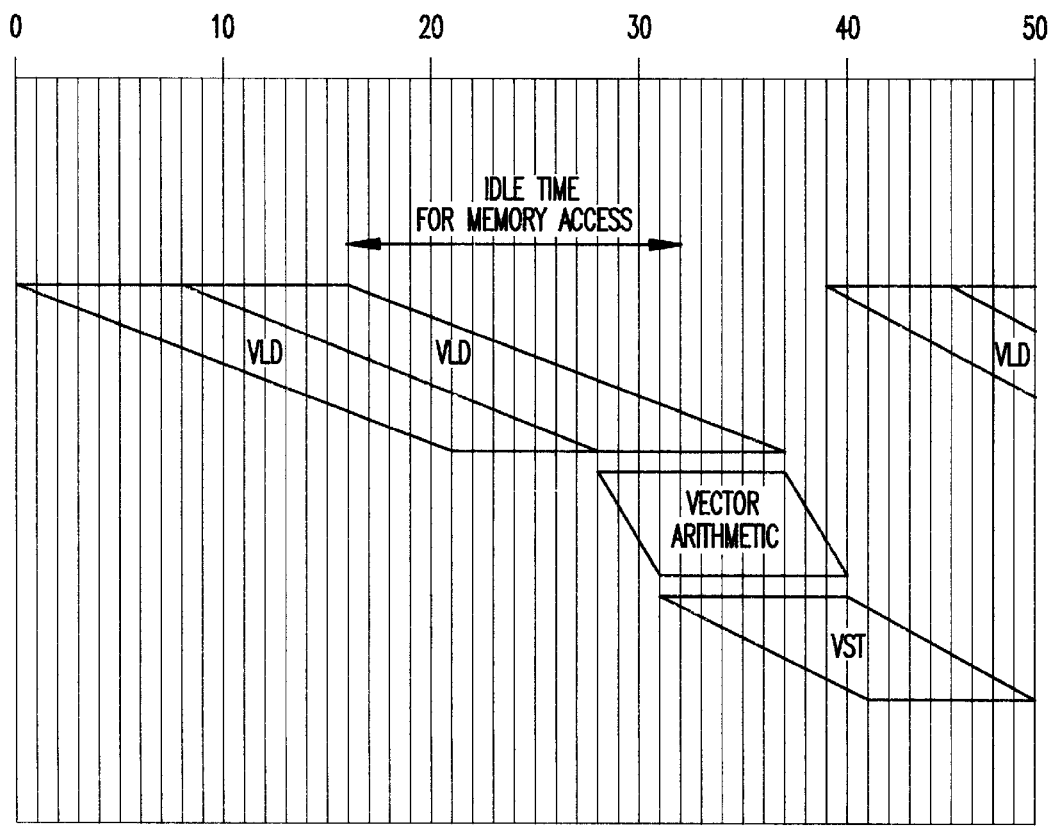
FIG. 9 is an example of an instruction sequence used for describing the present invention and the prior art.
FIG. 10 is a diagram showing operation of vector processing in a conventional vector processing unit without a data buffer.
Figure 11:
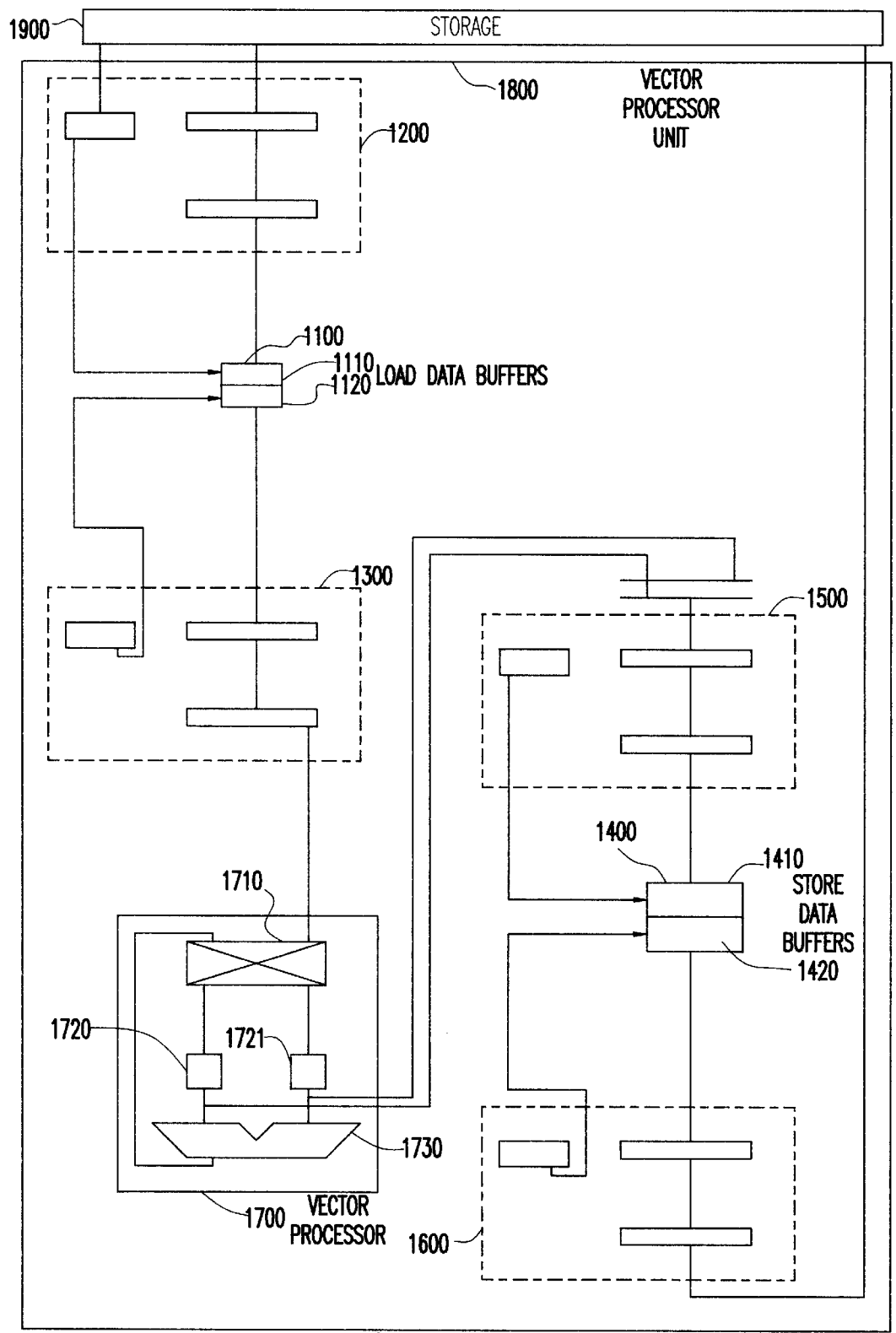
FIG. 11 is a configuration of a conventional vector processing unit with a data buffer.
Figure 12A:
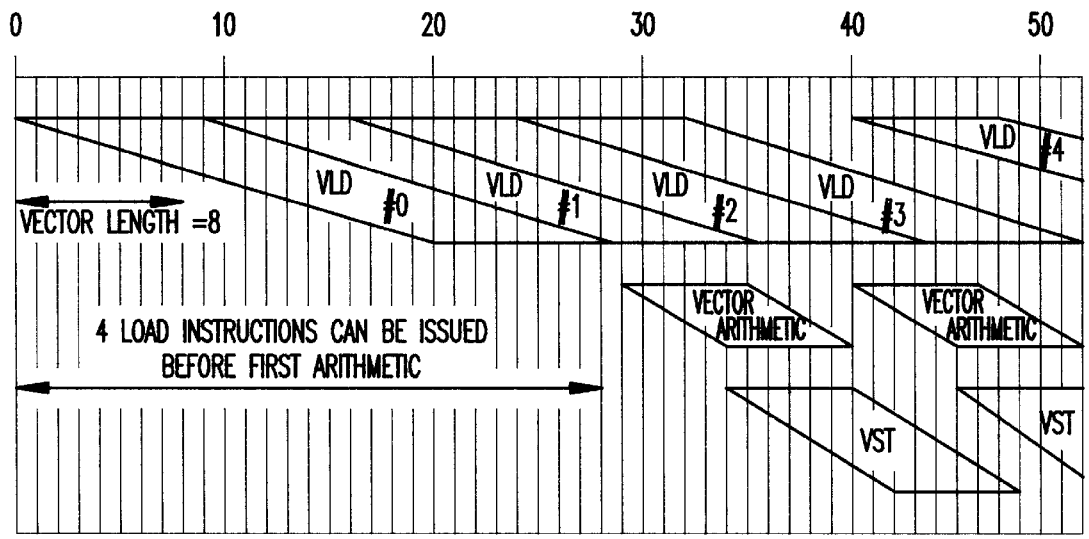
FIGS. 12 (A) and 12 (B) are a diagram showing operation of vector processing in an ideal vector processing unit with a number of data buffers.
Figure 12B:
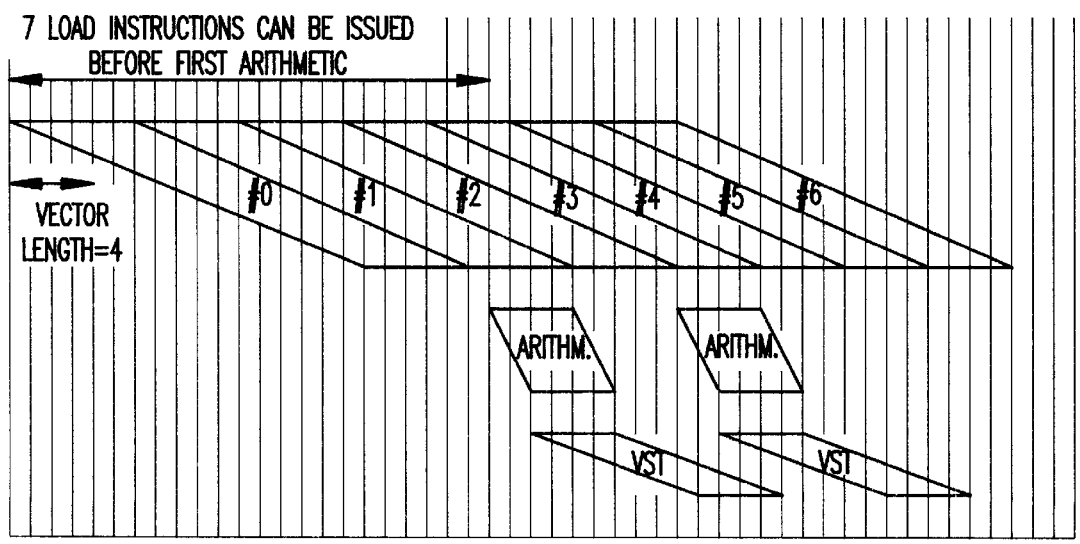

Taking the instruction sequence of FIG. 9 described above as an example, when the vector length is 16, they are executed in the embodiment as shown in FIG. 7. The vector load instructions of instructions (1), (2), (5), and (6) are assigned to the virtual buffers #0, #1, #2, and #3 of the load data buffer, respectively. Similarly, the vector store instructions of instructions (4) and (8) are assigned to the virtual buffers #0 and #1 of the store data buffer, respectively.

Referring to FIG. 7, first, the vector load instructions of instructions (1) and (2) are assigned to the virtual buffers #0 and #1 of the load data buffer 110, respectively. The vector load instructions of instructions (5) and (6) are assigned to the virtual buffers #2 and #3 of the load data buffer 110, respectively. On the other hand, the vector store instructions of instructions (4) and (8) are assigned to the virtual buffers #0 and #1 of the store data buffer 410.

Figure 13:
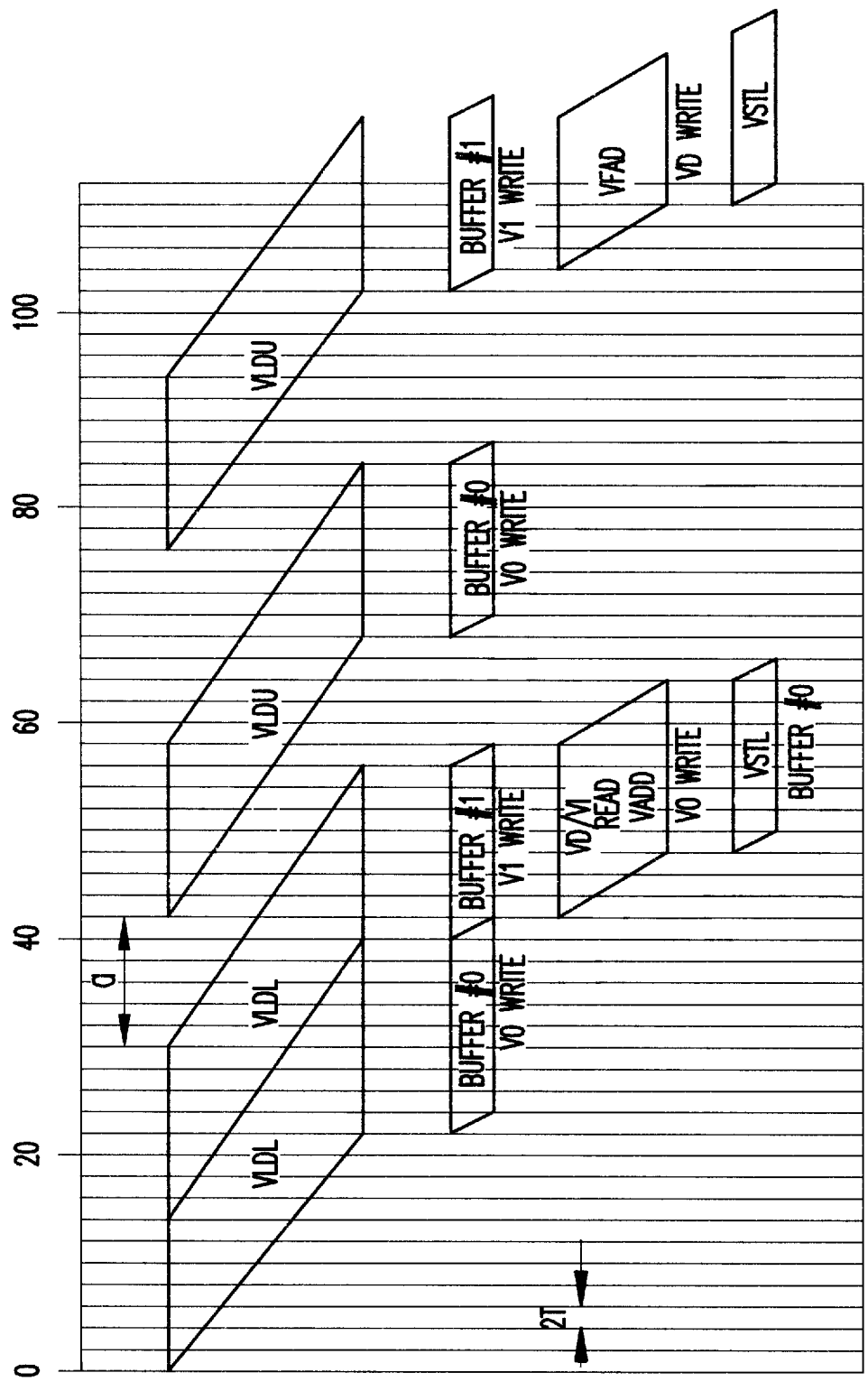
FIG. 13 is a diagram showing operation of vector processing in a conventional vector processing unit with a data buffer.
Figure 14:
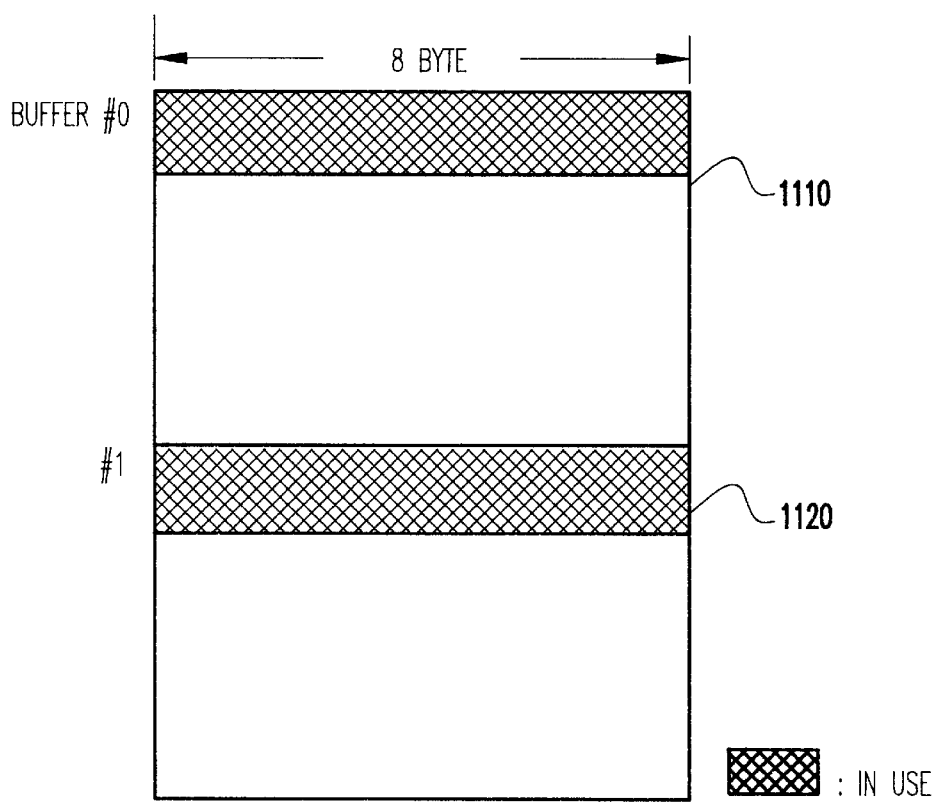
FIG. 14 is a diagram showing how to use the load data buffer and the store data buffer in the conventional vector processing unit.
Figure 14:
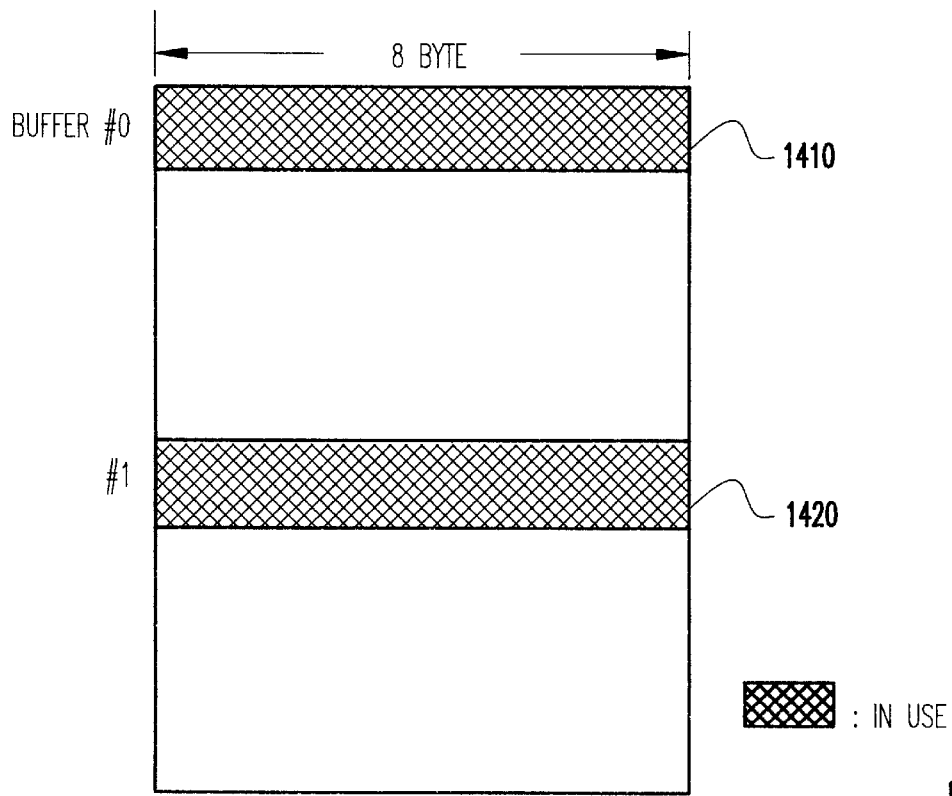

When the time chart of FIG. 7 is compared with that of the conventional vector processing unit shown in FIG. 13, the embodiment enables it to perform access without any interval without being aware of the state of the vector register because four virtual buffers #0, #1, #2, and #3 are provided in the load data buffer 110. Accordingly, there arises no wait for empty space in the buffer as in the prior art so that the performance can be improved.

Figure 8:
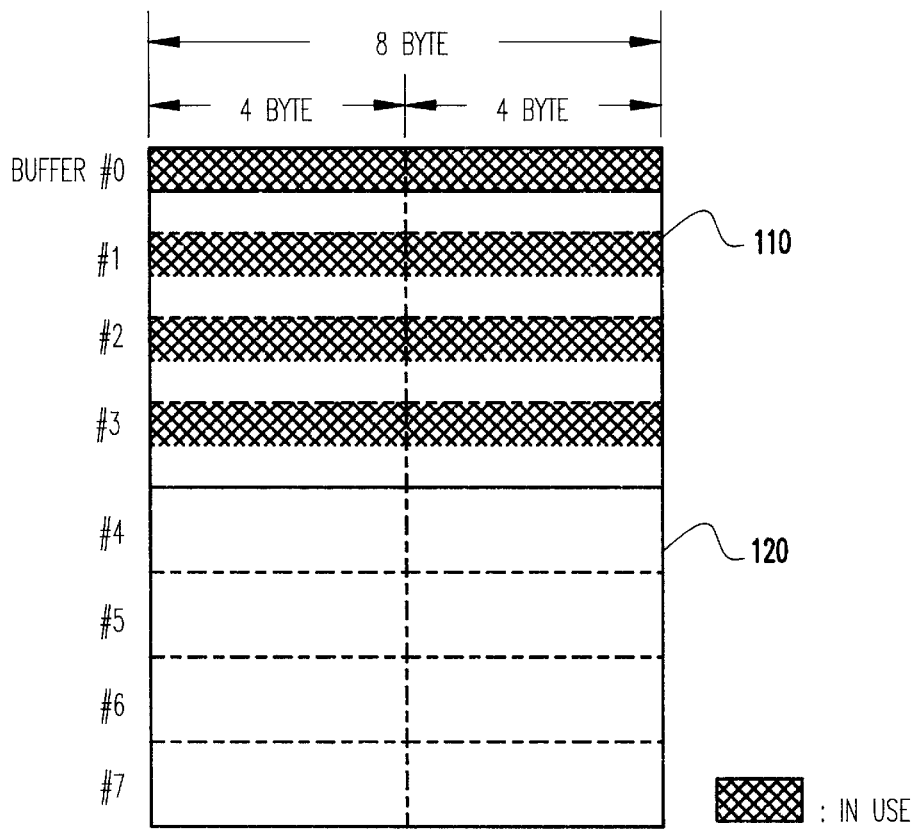
FIG. 8 is a diagram showing how to use the load data buffer and the store data buffer in the present invention.
Figure 8:
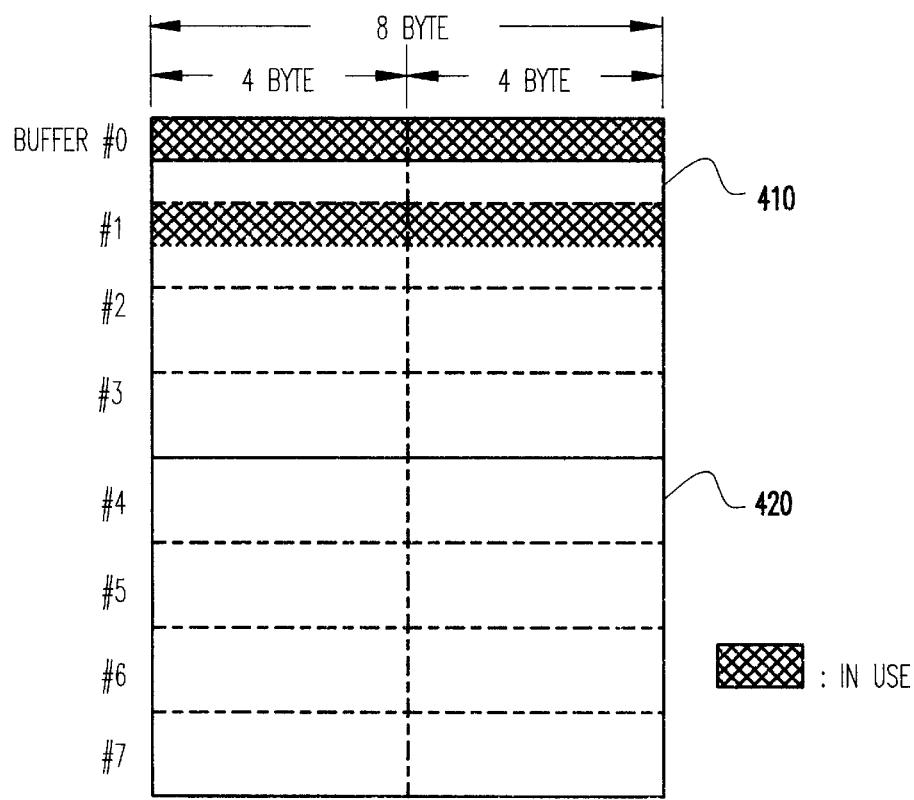

In the above processing, the load data buffer 110 and the store data buffer 410 are used as shown in FIG. 8, respectively. According to the present invention, since each data is compressed and stored in the load data buffer 110 and the store data buffer 410, the data buffer with fixed capacity can be efficiently used.

As described above, according to the present invention, the data buffer can be efficiently used even when the vector length is short by using the load data buffer and the store data buffer provided between the vector register and the storage as a plurality of virtual buffers, respectively. In addition, since the present invention has a function of compressing data when it is stored in the data buffer and expanding data when it is read, the data buffer can be efficiently used even if the data width is narrow.

What is claimed is:

1. A vector processing unit, comprising:

a vector processor having a vector register;

data buffer means for forming a variable number of virtual load, located between the vector register and a storage, for storing data read from the storage and having a data input port and a data output port, said input port being coupled to the storage and said output port being coupled to said vector register, said data buffer means including means for converting an externally generated virtual buffer number and an externally generated vector element number to a buffer write address, in accordance with an externally generated instruction type signal, data buffers, each comprising a plurality of buffer divisions, each of said buffer divisions including a number of word storage locations, said buffer divisions and said word storage locations being addressable by said buffer write address, wherein said means for converting comprises:

means for adding a number of bits of said externally generated buffer number to said number of bits of said externally generated vector element number, said number based on said externally generated instruction type signal, and for outputting a resulting sum signal, and means for combining said sum signal, a plurality of bits of said externally generated buffer number, and a plurality of bits of said externally generated vector element number, and for outputting the result as said buffer write address;

said vector register storing data read from said data buffers, whereby the virtual load buffers have a variable number of said buffer divisions and thereby have a variable number of storable words and thereby provide substantially uninterrupted transfer of vector data between said storage and said data buffer means during a temporary interruption of data transfer between the data buffer means' vector data output to the vector register.

2. The vector processing unit according to claim 1, wherein:

said data buffers are further arranged to also vary data width for each word.

3. The vector processing unit according to claim 2, wherein said data buffers include means for varying the data width for said each word.

4. The vector processing unit according to claim 1, wherein said data buffers include means for varying the number of storable words and the number of divisions of said buffers.

5. A vector processing unit, comprising:

a vector processor having a vector register; and data buffers, located between the vector register and a storage, said data buffers having a data input port and a data output port, said data input port being coupled to one of the vector register and the storage, and said data output port being coupled to the other of said vector register and the storage, said data buffers having means for converting an externally generated virtual buffer identification number and an externally generated vector element number to a buffer physical address, said conversion being in accordance with an externally generated instruction type signal, wherein each of said data buffers comprises load data buffers for storing data loaded from the storage, each of said load data buffers comprising a plurality of virtual load buffers, each of said virtual load buffers comprising storage regions within said load data buffers, said storage regions addressable by said buffer physical address, said virtual buffers accessible by said externally generated identification numbers and said externally generated vector element numbers, and wherein said means for converting comprises:
 means for adding a number of bits of said externally generated virtual buffer identification number to a number of bits of said externally generated vector element number, said number in accordance with said externally generated instruction type signal, and for outputting a resulting sum signal, and
 means for combining said sum signal, a plurality of bits of said externally generated buffer identification number, and a plurality of bits of said externally generated vector element number, and for outputting the resulting combination as said buffer physical address;

said vector register storing data read from said data buffers and data to be stored in said data buffers, whereby the data buffers, by the plurality of virtual load buffers, provide a substantially uninterrupted transfer of vector data with said storage during an interruption of a data transfer between the data buffer and the vector register.

6. The vector processing unit according to claim 5, wherein:

each of said load data buffers comprises:
 means for compressing and storing data in a vector data loaded from the storage in said virtual load buffers; and
 means for expanding the data in the vector data stored in said virtual load buffers.

7. The vector processing unit according to claim 5, wherein:

each of said data buffers further comprises store data buffers for storing data to be stored in the storage, said store data buffers having a plurality of virtual store buffers and being identified by identification numbers assigned to said virtual store buffers.

8. The vector processing unit according to claim 7, wherein:

each of said store data buffers comprises:
 means for compressing and storing data in a vector data loaded from the storage in said virtual store buffers; and
 means for expanding the data in the vector data stored in said virtual store buffers.

9. The vector processing unit according to claim 5, wherein said data buffers include means for varying the number of storable words and the number of divisions of said buffers.

10. The vector processing unit according to claim 5, wherein said data buffers include means for varying the data width for said each word.

* * * * *